(12) United States Patent
Scheckenbach et al.

(10) Patent No.: US 7,656,169 B2
(45) Date of Patent: Feb. 2, 2010

(54) CAPACITIVE OCCUPANT DETECTION SYSTEM

(75) Inventors: Ingrid Scheckenbach, Ferschweiler (DE); Stephen Fuks, Ann Arbor, MI (US); Frank Althaus, Saarlouis (DE); Thomas Krautheim, Dearborn, MI (US); Christoph Wendt, Trier (DE)

(73) Assignee: IEE International Electronics & Engineering S.A., Luxembourg (LU)

( * ) Notice: Subject to any disclaimer, the term of this patent is extended or adjusted under 35 U.S.C. 154(b) by 376 days.

(21) Appl. No.: 11/702,770

(22) Filed: Feb. 6, 2007

(65) Prior Publication Data

US 2008/0186034 A1 Aug. 7, 2008

(51) Int. Cl.
*G01R 27/26* (2006.01)
(52) U.S. Cl. ............... 324/679; 324/688; 324/663; 280/735; 701/45
(58) Field of Classification Search .............. 324/688, 324/679, 663; 340/667
See application file for complete search history.

(56) References Cited

U.S. PATENT DOCUMENTS

| | | | |
|---|---|---|---|
| 3,683,351 A | 8/1972 | Wilcox | |
| 4,305,074 A | 12/1981 | Barzana et al. | |
| 4,743,902 A | 5/1988 | Andermo | |
| 5,166,679 A | 11/1992 | Vranish et al. | |
| 5,214,388 A | 5/1993 | Vranish et al. | |
| 5,232,243 A | 8/1993 | Blackburn et al. | |
| 5,247,281 A | 9/1993 | Facon et al. | |
| 5,373,245 A | 12/1994 | Vranish | |
| 5,442,347 A | 8/1995 | Vranish | |
| 5,490,069 A | 2/1996 | Gioutsos et al. | |
| 5,554,973 A | 9/1996 | Kawashima et al. | |
| 5,612,876 A | 3/1997 | Zeidler et al. | |
| 5,653,462 A | 8/1997 | Breed et al. | |

(Continued)

FOREIGN PATENT DOCUMENTS

| | | |
|---|---|---|
| DE | 102007051827 | 5/2008 |
| EP | 1034412 | 9/2000 |
| WO | 9728989 | 4/1997 |

OTHER PUBLICATIONS

U. S. Appl. No. 60/762,124, filed Jan. 26, 2006.
U. S. Appl. No. 60/824,001, filed Aug. 30, 2006.

*Primary Examiner*—Timothy J Dole
*Assistant Examiner*—John Zhu
(74) *Attorney, Agent, or Firm*—Cantor Colburn LLP

(57) ABSTRACT

A capacitive occupant detection system has an oscillator and an electrode operatively coupled to the oscillator, to which the oscillator applies an oscillating voltage signal. In response to the oscillating voltage being applied, an electric current is caused to flow in the electrode, the current being responsive to an electric-field-influencing property of an object or occupant proximate to the electrode. The current caused to flow in the electrode has a first current component in phase with the oscillating voltage signal and a second current component 90°-phase-offset with respect to the oscillating voltage signal. A sensing circuit is operatively coupled to the electrode and to the oscillator so as to generate a first signal indicative of the first current component and a second signal indicative of the second current component. The first signal indicative of the first current component and the second signal indicative of the second current component are provided to a processor, which is operatively coupled to the sensing circuit and which determines an occupancy state based upon the first and second signals indicative of the first and second current components, respectively, and outputs an output signal indicative of the occupancy state.

26 Claims, 5 Drawing Sheets

U.S. PATENT DOCUMENTS

| | | |
|---|---|---|
| 5,657,012 A | 8/1997 | Tait |
| 5,726,581 A | 3/1998 | Vranish |
| 5,770,997 A | 6/1998 | Kleinberg et al. |
| 5,871,232 A | 2/1999 | White |
| 5,890,085 A | 3/1999 | Corrado et al. |
| 5,948,031 A | 9/1999 | Jinno et al. |
| 5,964,478 A | 10/1999 | Stanley et al. |
| 6,020,812 A | 2/2000 | Thompson et al. |
| 6,043,743 A | 3/2000 | Saito et al. |
| 6,079,738 A | 6/2000 | Lotito et al. |
| 6,135,494 A | 10/2000 | Lotito et al. |
| 6,161,070 A | 12/2000 | Jinno et al. |
| 6,208,249 B1 | 3/2001 | Saito et al. |
| 6,225,710 B1 | 5/2001 | Palata et al. |
| 6,260,879 B1 | 7/2001 | Stanley |
| 6,275,146 B1 | 8/2001 | Kithil et al. |
| 6,283,504 B1 | 9/2001 | Stanley et al. |
| 6,290,255 B1 | 9/2001 | Stanley et al. |
| 6,292,727 B1 | 9/2001 | Norton |
| 6,302,438 B1 | 10/2001 | Stopper, Jr. et al. |
| 6,310,407 B1 | 10/2001 | Saito et al. |
| 6,325,413 B2 | 12/2001 | Saito et al. |
| 6,329,913 B1 | 12/2001 | Shieh et al. |
| 6,329,914 B1 | 12/2001 | Shieh et al. |
| 6,335,684 B1 | 1/2002 | Eisenmann et al. |
| 6,348,862 B1 | 2/2002 | McDonnell et al. |
| 6,366,200 B1 | 4/2002 | Aoki |
| 6,378,900 B1 | 4/2002 | Stanley et al. |
| 6,392,542 B1 | 5/2002 | Stanley |
| 6,397,136 B1 | 5/2002 | Breed et al. |
| 6,404,074 B2 | 6/2002 | Saito et al. |
| 6,422,595 B1 | 7/2002 | Breed et al. |
| 6,429,782 B2 | 8/2002 | Pavatich et al. |
| 6,445,294 B1 | 9/2002 | McDonnell et al. |
| 6,445,988 B1 | 9/2002 | Breed et al. |
| 6,448,789 B1 | 9/2002 | Kraetzl |
| 6,490,515 B1 | 12/2002 | Okamura et al. |
| 6,517,106 B1 | 2/2003 | Stanley et al. |
| 6,517,107 B2 | 2/2003 | Johnson et al. |
| 6,520,535 B1 | 2/2003 | Stanley et al. |
| 6,556,137 B1 | 4/2003 | Oka et al. |
| 6,559,555 B1 | 5/2003 | Saitou et al. |
| 6,563,231 B1 | 5/2003 | Stanley et al. |
| 6,577,023 B1 | 6/2003 | Stanley et al. |
| 6,584,387 B1 | 6/2003 | Norton |
| 6,609,055 B2 | 8/2003 | Stanley |
| 6,644,689 B2 | 11/2003 | Murphy |
| 6,696,948 B2 | 2/2004 | Thompson et al. |
| 6,703,845 B2 | 3/2004 | Stanley et al. |
| 6,707,306 B1 | 3/2004 | Wendt |
| 6,816,077 B1 | 11/2004 | Shieh et al. |
| 6,820,897 B2 | 11/2004 | Breed et al. |
| 6,825,765 B2 | 11/2004 | Stanley et al. |
| 6,831,565 B2 | 12/2004 | Wanami et al. |
| 6,942,248 B2 | 9/2005 | Breed et al. |
| 6,956,465 B2 | 10/2005 | Meyer et al. |
| 6,960,841 B2 | 11/2005 | Saitou et al. |
| 6,968,263 B1 | 11/2005 | Norton |
| 6,971,669 B2 | 12/2005 | Aoki et al. |
| 7,065,438 B2 | 6/2006 | Thompson et al. |
| 7,084,763 B2 | 8/2006 | Shieh et al. |
| 7,098,674 B2 | 8/2006 | Stanley et al. |
| 7,102,527 B2 | 9/2006 | Shieh et al. |
| 7,129,714 B2 | 10/2006 | Baxter |
| 7,135,983 B2 | 11/2006 | Filippov et al. |
| 7,151,452 B2 | 12/2006 | Shieh |
| 2002/0003345 A1 | 1/2002 | Stanley et al. |
| 2002/0059022 A1 | 5/2002 | Breed et al. |
| 2002/0089157 A1 | 7/2002 | Breed et al. |
| 2002/0125050 A1 | 9/2002 | Breed et al. |
| 2002/0190727 A1 | 12/2002 | Morimoto |
| 2003/0009273 A1 | 1/2003 | Stanley et al. |
| 2003/0023362 A1 | 1/2003 | Breed et al. |
| 2003/0060957 A1 | 3/2003 | Okamura et al. |
| 2003/0083795 A1 | 5/2003 | Stanley |
| 2003/0122669 A1 | 7/2003 | Filippov et al. |
| 2003/0151239 A1 | 8/2003 | Murphy |
| 2003/0168838 A1 | 9/2003 | Breed et al. |
| 2004/0004488 A1 | 1/2004 | Baxter |
| 2004/0111201 A1 | 6/2004 | Thompson et al. |
| 2004/0232774 A1 | 11/2004 | Thompson et al. |
| 2005/0093868 A1 | 5/2005 | Hinckley |
| 2005/0099188 A1 | 5/2005 | Baxter |
| 2005/0121891 A1 | 6/2005 | Sollars, Jr. |
| 2005/0128082 A1 | 6/2005 | Stanley et al. |
| 2005/0154516 A1 | 7/2005 | Dirand et al. |
| 2005/0219126 A1 | 10/2005 | Rebeiz et al. |
| 2005/0253712 A1 * | 11/2005 | Kimura et al. .............. 340/562 |
| 2005/0273218 A1 | 12/2005 | Breed et al. |
| 2005/0275202 A1 | 12/2005 | Wato et al. |
| 2006/0109091 A1 | 5/2006 | Rittmueller et al. |
| 2006/0164254 A1 | 7/2006 | Kamizono et al. |
| 2006/0187038 A1 | 8/2006 | Shieh et al. |
| 2006/0244246 A1 | 11/2006 | Breed et al. |
| 2006/0267321 A1 | 11/2006 | Harish et al. |
| 2006/0267566 A1 | 11/2006 | Williams et al. |
| 2007/0132559 A1 * | 6/2007 | Schleeh ................... 340/425.5 |
| 2007/0192007 A1 | 8/2007 | Stanley et al. |

* cited by examiner

CAPACITIVE OCCUPANT DETECTION SYSTEM

FIELD OF THE INVENTION

The present invention generally relates to a capacitive occupant detection system, more specifically to such system for detecting the absence or presence of an occupant seated on a vehicle seat.

BACKGROUND OF THE INVENTION

As used herein, a capacitive occupant detection system refers to a capacitive sensor adapted for detecting the occupancy state of a vehicle seat. A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one electrode, to which is applied an oscillating electric signal and which thereupon emits an electric field into a region of space proximate to the electrode, while the sensor is operating. The sensor comprises at least one sensing electrode—which could comprise the same electrode or electrodes, to which the oscillating electric signal is applied—at which the influence of an object or living being on the electric field is detected.

The technical paper entitled "Electric Field Sensing for Graphical Interfaces" by J. R. Smith, published in Computer Graphics I/O Devices, Issue May/June 1998, pp 54-60 describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

The above-cited documents are herewith incorporated herein by reference in their entirety.

SUMMARY OF THE INVENTION

The present invention provides an improved capacitive occupant detection system, e.g. for detecting the occupancy state of a vehicle seat in order to provide a control signal to an airbag system governing deployment or non-deployment of an airbag during a collision. According to a first aspect of the invention, such capacitive detection system comprises an oscillator, such as e.g. a voltage-controlled oscillator or a numerically controlled oscillator, and an electrode operatively coupled to the oscillator, to which the oscillator applies an oscillating voltage signal. In response to the oscillating voltage being applied, an electric current is caused to flow in the electrode, the current being responsive to an electric-field-influencing property of an object or occupant proximate to the electrode. As those skilled in the art will know, the current caused to flow in the electrode has a first current component in phase with the oscillating voltage signal and a second current component 90°-phase-offset with respect to the oscillating voltage signal, i.e. the current may be considered to be the sum or superposition of the in-phase (the "first") and the 90°-phase-offset (the "second") current components. A sensing circuit is operatively coupled to the electrode and to the oscillator so as to generate a first signal indicative of the first current component and a second signal indicative of the second current component. The first signal indicative of the first current component and the second signal indicative of the second current component are provided to a processor, which is operatively coupled to the sensing circuit and which determines an occupancy state based upon the first and second signals indicative of the first and second current components, respectively, and outputs an output signal (e.g. the above-mentioned airbag control signal) indicative of the occupancy state.

As will be appreciated, in a system according to the first aspect, the electrode to which the oscillating voltage signal is applied is the same as that for which the current components are determined. According to Smith's above-mentioned paper such a system would be considered to operate in "loading mode". A second aspect of the invention relates more specifically to the "coupling mode". Such capacitive occupant detection system comprises a transmitting electrode, which is operatively coupled to the oscillator, the oscillator being configured for applying an oscillating voltage signal to the transmitting electrode, and a sensing electrode for being arranged in proximity of the transmitting electrode in such a way that a current may be caused to flow in the sensing electrode by capacitive coupling between the transmitting electrode and the sensing electrode. The current is responsive to an electric-field-influencing property of an object or occupant in a region between the transmitting and sensing electrodes and current occurs with the first current component in phase with the applied oscillating voltage signal and the second current component 90-degrees-phase-offset with respect to the oscillating voltage signal. In a system according to the second aspect, the sensing circuit is operatively coupled to the sensing electrode and to the oscillator and configured for generating a first signal indicative of the first current component and a second signal indicative of the second current component. The processor, operatively coupled to the sensing circuit, determines the occupancy state based upon the first and second signals indicative of the first and second current components, respectively, and output the output signal indicative of whether an occupant is absent or present in the region between the transmitting and sensing electrodes.

Those skilled in the art will appreciate that a capacitive occupant detection system may integrate the features according to both the first and the second aspect. Such system would include a transmitting electrode connected to the oscillator and to a sensing circuit as recited above with respect to the first aspect and a sensing electrode connected to a sensing circuit as recited with respect to the second aspect. The transmitting electrode is in this case also a sensing electrode. It is not excluded, of course, that a system includes a plurality of electrodes configured as combined transmitting and sensing electrodes.

Turning again to the system under the first aspect, the electrode, that an oscillating voltage is applied to by the oscillator preferably has a so-called shielding electrode placed adjacent to it, the shielding electrode being driven with substantially the same (with respect to amplitude and phase) applied voltage as the transmitting and sensing electrode (referred to as the "sensing electrode" for conciseness). The shielding electrode being at any moment at substantially the same electric potential as the sensing electrode, the electric field between the two electrodes is substantially zero. This provides for shielding the sensing electrode against parasitic capacitances behind the shielding electrode, with respect to the sensing electrode. In a vehicle seat, the sensing electrode is advantageously arranged underneath a seat surface, which an occupant comes in contact with when seated on the seat, whereas the shielding electrode is located adjacent the sensing electrode on the side of the latter facing away from the seat surface. Those skilled will appreciate that shielding electrodes could also be provided to the electrodes of a system according to the second aspect.

In the following, details with respect to preferred embodiments of a capacitive sensing system will be discussed.

The applied oscillating voltage signal advantageously could be a sinusoidal voltage signal (e.g. a sine voltage signal or a cosine voltage signal) having a number of oscillation periods. Such oscillating voltage signals are positive during first time intervals, negative during second time intervals, have a positive slope during third time intervals and a negative slope during fourth time intervals. Each one of the first, second, third and fourth time intervals has a duration of half the oscillation period. The first time intervals are in alternate succession with the second time intervals and the third time intervals are in alternate succession with the fourth time intervals, whereas each of the first intervals overlaps with one of the third intervals and one of the fourth intervals, and each of the second intervals overlaps with one of the third intervals and one of the fourth intervals.

The sensing circuit preferably comprises a current-to-voltage converter operatively coupled to the electrode so as to output a voltage signal (hereinafter referred to as "converter voltage signal") proportional to the current flowing in the electrode and a clocked rectifier operatively coupled to the oscillator and to the current-to-voltage converter. The clocked rectifier provides:

(a) a first intermediate voltage signal comprising, during the first time intervals, one of a non-inverse copy and an inverse copy of the converter voltage signal and, during the second time intervals, the other of the non-inverse copy and the inverse copy, and (b) a second intermediate voltage signal comprising, during the third time intervals, one of a non-inverse copy and an inverse copy of the converter voltage signal and during the fourth time intervals the other of the non-inverse copy and the inverse copy.

As an output or outputs, the clocked rectifier generates the first signal indicative of the first current component as a time average or time integral of the first intermediate voltage signal and the second signal indicative of the second current component as a time average or time integral of the second intermediate voltage signal.

The clocked rectifier could provide the first intermediate voltage signal and the first signal indicative of the first current component in alternation with the second intermediate voltage signal and the second signal indicative of the second current component. Alternatively, the clocked rectifier could provide the first intermediate voltage signal and the first signal indicative of the first current component in parallel with the second intermediate voltage signal and the second signal indicative of the second current component.

As will be appreciated, the clocked rectifier could comprise at least one amplifier circuit operatively connected to the current-to-voltage converter, the at least one amplifier circuit being capable of alternately inverting and non-inverting the converter voltage signal so as to provide the inverted and non-inverted copies of the first and/or second intermediate voltage signals, and a switch operatively connected to the at least one amplifier circuit for switching the at least one amplifier circuit between inverting and non-inverting the converter voltage signal. The at least one amplifier circuit could include a single amplifier suitably wired for assuming both inverting and non-inverting operations, or alternatively, an inverting amplifier and a non-inverting amplifier, wherein the switch alternately switches to the inverting amplifier and the non-inverting amplifier.

More preferably, the clocked rectifier could comprise (a) at least one first amplifier circuit operatively connected to the current-to-voltage converter and a first switch switching the at least one first amplifier circuit between inverting and non-inverting the converter voltage signal so as to provide the inverted and non-inverted copies of the first intermediate voltage signal, and (b) at least one second amplifier circuit operatively connected to the current-to-voltage converter and a second switch switching the at least one second amplifier circuit between inverting and non-inverting the converter voltage signal so as to provide the inverted and non-inverted copies of the second intermediate voltage signal. Advantageously, the clocked rectifier could comprise a first low-pass filter or integrator and a second low-pass filter or integrator, and at least one first and second amplifiers could include, respectively, an inverting amplifier and a non-inverting amplifier, the respective switch alternately switching the respective inverting amplifier or non-inverting amplifier to the respective low-pass filter or integrator. It may also be possible, by adequate wiring, to use a single amplifier for both the inverting and non-inverting functionalities.

The clocked rectifier could comprise at least one low-pass filter providing the first signal indicative of the first current component as a time average of the first intermediate voltage signal and/or the second signal indicative of the second current component as a time average of the second intermediate voltage signal. Alternatively, the clocked rectifier could comprise at least one integrator providing the first signal indicative of the first current component as a time integral of the first intermediate voltage signal and/or the second signal indicative of the second current component as a time integral of the second intermediate voltage signal.

As mentioned above, the processor, which could be a microprocessor or a dedicated logic circuit, determines the occupancy state based upon the first and second signals indicative of the first and second current components. Those skilled will appreciate that this could be done in various ways. For instance, the processor could associate to the first and second signals a point in an at least two-dimensional space, in which regions are defined that correspond to different occupancy states. The occupancy state output by the processor would in this case be the one in whose region the point associated to the first and second signals is located. The processor could also determine the occupancy state based upon a comparison of the second signal indicative of the second current component with a threshold, the threshold being dependent upon the first signal indicative of the first current component. Most preferably, this threshold would be a growing function of the first signal indicative of the first current component, e.g. to take a wetting condition of the seat into account. As a possible alternative, the processor could modify the second signal indicative of said second current component based upon the first signal indicative of said first current component and determine the occupancy state based upon a comparison of the modified second signal with a threshold. In this case, the threshold could be a fixed value.

BRIEF DESCRIPTION OF THE DRAWINGS

Further details and advantages of the present invention will be apparent from the following detailed description of not limiting embodiments with reference to the attached drawings, wherein.

DESCRIPTION OF THE PREFERRED EMBODIMENTS

Figure 1:
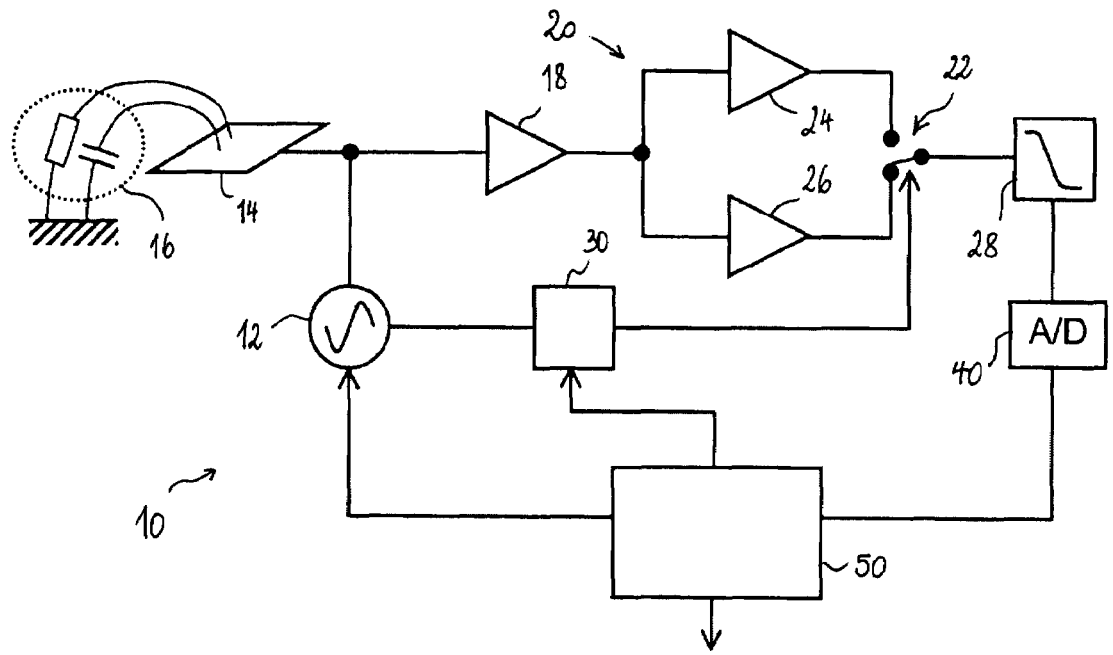
FIG. 1 is a simplified block diagram showing a first embodiment of a loading-mode occupant detection system.

A simplified circuit of a loading-mode capacitive occupant detection system 10 is illustrated in FIG. 1. An oscillator 12 applies a sinusoidal voltage signal $V_a$ of a chosen frequency to the transmitting and sensing electrode 14. In response to the oscillating voltage signal $V_a$ being applied to electrode 14 a current is caused to flow therein. The characteristics of this current depend on the impedance (capacitance and resistance, shown at reference numeral 16) between the electrode 14 and ground. The impedance and the current allow drawing conclusions with respect to the presence or absence of objects or occupants in proximity of the electrode 14. The current flowing in the electrode 14 can be expressed as a sum of a first current signal which is in phase with the applied oscillating voltage signal and a second current signal which is 90°-phase-offset with respect to the applied oscillating voltage signal. For instance, assuming that the applied voltage signal can be expressed as $V_a(t)=v_0 \cdot \sin(\omega \cdot t)$, t being a time variable, $v_0$ the amplitude of the applied voltage signal and $\omega$ the angular frequency, the current can be expressed as $I(t)=i_0 \cdot \alpha \cdot \sin(\omega \cdot t) + i_0 \cdot \beta \cdot \cos(\omega \cdot t)$ where $i_0$ is the amplitude of the current and $\alpha$ and $\beta$ coefficients with $\alpha^2+\beta^2=1$. As can be seen, the first term (the first or "in-phase" current component) is in phase with the applied voltage signal, and the second term (the second or "90°-phase-offset" current component) is 90°-phase-offset with respect to the applied voltage signal. Those skilled will note that the first current component indicates the resistive part of the impedance 16, whereas the second current component indicates the capacitive part.

We will turn now, for sake of illustration, to the particular case of electrode 14 being integrated underneath the surface of a seat. For a dry and empty seat, both in-phase and 90°-phase-offset components of the current are low. If the seat is dry and occupied by a person, the impedance 16 remains predominantly capacitive in nature but the capacitance increases, which is reflected by an increase of the phase-offset current component with respect to the empty seat situation. If it were ascertained that the seat is always dry, determining only the phase-offset current component could already allow determination of the occupancy state of the seat. However, water present on the seat causes both the capacitive and resistive parts of the impedance to be substantially higher than in case of a dry seat. As a consequence, deciding whether the seat is empty or occupied based solely upon the 90°-phase-offset current component may lead to erroneously detecting an occupant if the seat is empty and wet. Capacitive occupant detection systems therefore advantageously determine the in-phase current component in addition to the phase-offset current component.

As shown in FIG. 1, current-to-voltage converter 18 (e.g. a transimpedance amplifier) converts the current flowing in the sensing electrode 14 into a voltage signal $V_c$, called herein the "converter voltage signal". It may be worthwhile noting that this conversion affects both above-mentioned components, which are not yet accessible as separate signals at current-to-voltage converter 18. The converter voltage signal $V_c$ is fed to a clocked rectifier 20 that includes a switch 22, a first branch with an inverting amplifier 24, a second branch with a non-inverting amplifier 26 and a low-pass filter 28. The converter voltage signal is supplied to the inverting amplifier 24 and the non-inverting amplifier 26. The gain of amplifier 24 is opposite to that of amplifier 26 (e.g. −1 and 1, respectively). The outputs of amplifiers 24 and 26 are combined in alternance and fed to the low-pass filter 28 by switch 22.

The switch 22 is controlled by a control circuit 30, which supplies a binary signal, i.e. a signal that can take two values. For the following explanations, reference is made to the timing diagram of FIG. 6. For determining the in-phase current component, the control circuit 30 makes the switch 22 switch to to the non-inverting amplifier 26 every time the oscillating voltage $V_a$ applied to the electrode is positive, i.e. during the above-mentioned first time intervals $TI_1$. If the oscillating voltage $V_a$ applied to the electrode is negative, i.e. during the second time intervals $TI_2$, control circuit 30 makes the switch 22 switch to inverting amplifier 24. The output signals of the amplifiers 24 and 26 are thus combined into an intermediate signal (the "first" intermediate signal) $V_{i1}$ and input to low-pass filter 28. The voltage signal $V_{o1}$ output in consequence by low-pass-filter 28 corresponds to a time-average of the first intermediate signal $V_{i1}$ and indicates the in-phase component of the current ($i_0 \cdot \alpha$ in the above example).

For determining the 90°-phase-offset current component, the control circuit 30 makes the switch 22 switch to the non-inverting amplifier 26 every time the oscillating voltage $V_a$ applied to the electrode is on a positive slope, i.e. during the above-mentioned third time intervals $TI_3$. If the oscillating voltage $V_a$ applied to the electrode is on a negative slope, i.e. during the fourth time intervals $TI_4$, control circuit 30 makes the switch 22 switch to inverting amplifier 24. The output signals of the amplifiers 24 and 26 are thus combined into an intermediate signal (the "second" intermediate signal) $V_{i2}$ and input to low-pass filter 28. The voltage signal $V_{o2}$ output in consequence by low-pass-filter 28 corresponds to a time-average of the second intermediate signal and indicates the 90°-phase-offset component of the current ($i_0 \cdot \beta$ in the above example).

Figure 7:
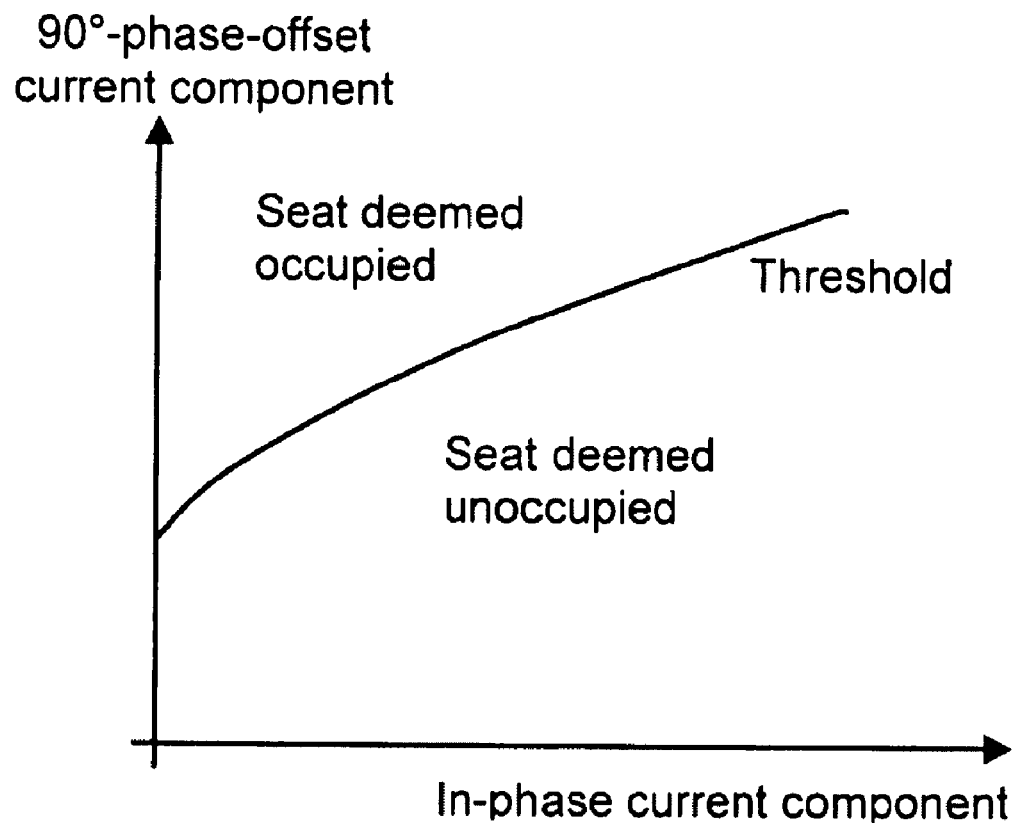
FIG. 7 is a graph representing, as a function of the in-phase current component, the threshold for the 90°-phase-offset current component, above which a seat is recognized as occupied and below which the seat is deemed unoccupied.

Low-pass filter 28 outputs the signals $V_{o1}$ and $V_{o2}$ indicative of the in-phase and 90°-phase-offset components as analog signals and feeds them to an analog-to-digital converter 40, which, in turn forwards them in digital form to microprocessor 50. Microprocessor 50 determines an occupancy state based upon the signals indicative, respectively, of the in-phase and the 90°-phase offset. In particular, it compares the signal indicative of the 90°-phase-offset current component with a threshold, the threshold being dependent upon the signal indicative of the in-phase current component. FIG. 7 shows a graph representing the threshold for the 90°-phase-offset current component as a function increasing with the in-phase current component. If the 90°-phase-offset current component (indicative of the capacitance) is found to be below the threshold curve for the determined in-phase current component (indicative of the resistance), the seat is deemed unoccupied by a person; if it is found to be above the threshold for the determined in-phase current component, the seat is deemed occupied by a person. Depending on the outcome of the determination of the occupancy state, the microprocessor 50 issues an output signal communicating the occupancy state to an appliance connected to the capacitive occupant detection system 10, e.g. the control unit of an airbag system or a seat belt warning device. The threshold for the 90°-phase-offset current component being increasing with increasing in-phase current component may compensate for the above-mentioned wet seat effect. Accordingly, a more reliable detection of an occupant may be achieved. As has been mentioned above, there are other ways by which determination of the occupancy state could be implemented in microprocessor 50.

Figure 6:
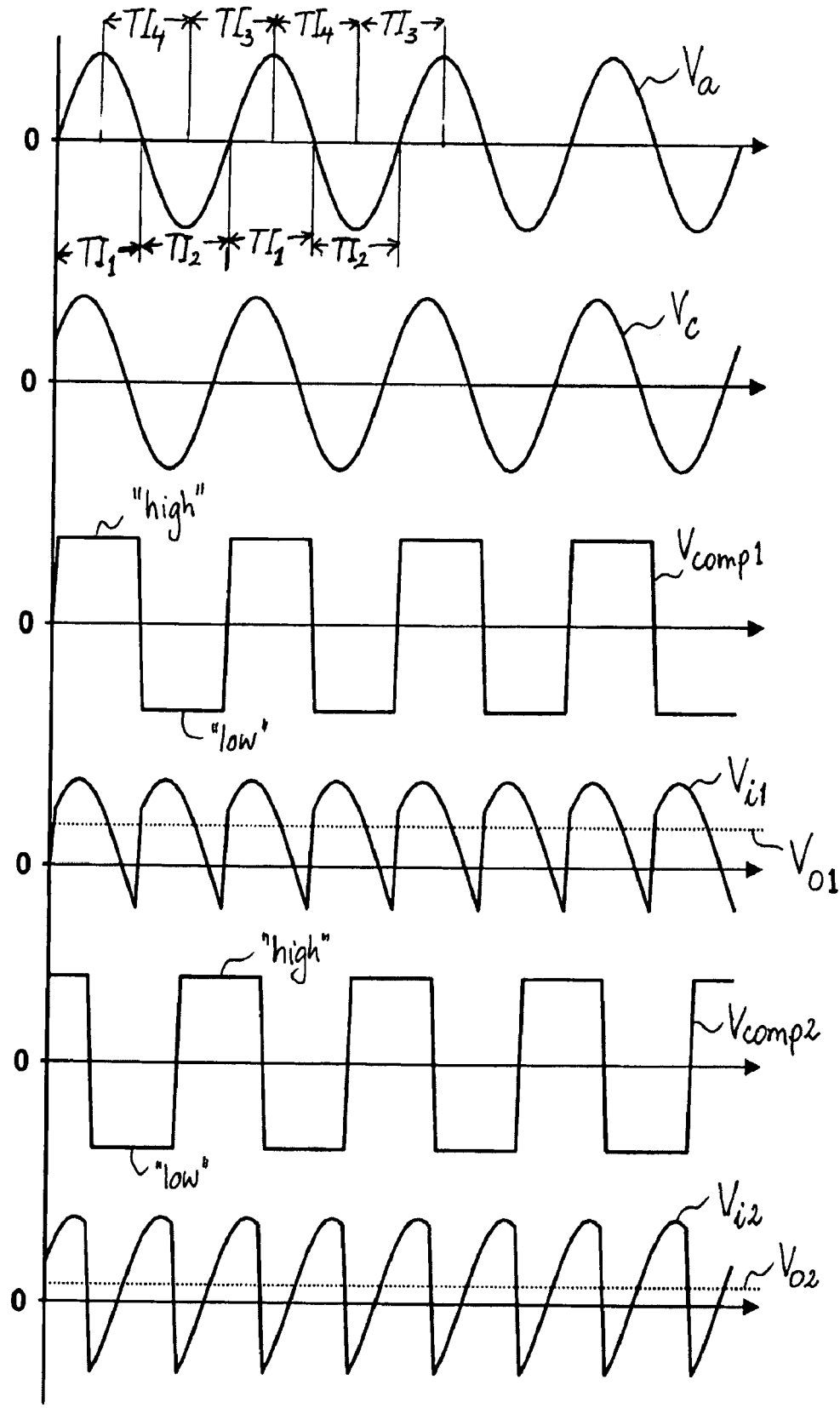
FIG. 6 is a timing chart illustrating the operation of an occupant detection system as illustrated in FIGS. 1 to 6.
Figure 8:
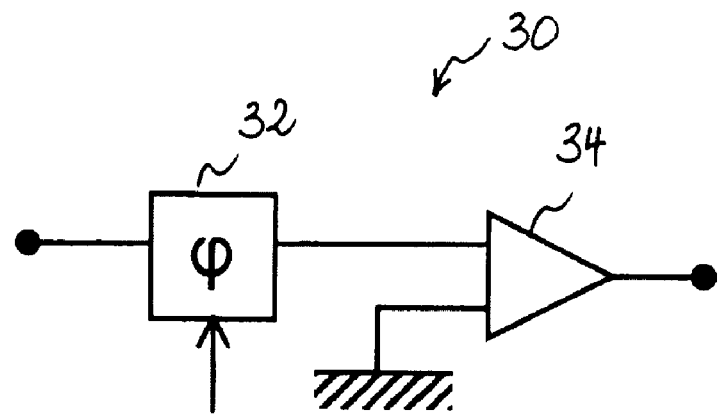
FIG. 8 is a schematic of an embodiment of a detail of the circuits represented in FIGS. 1-5.

It should be noted that the circuit 10 of FIG. 1 alternately determines in-phase and phase-offset components. Indeed, when the in-phase current component is determined, the switch switches at those points in time at which the oscillating voltage $V_a$ applied to the electrode 14 has a zero crossing. In contrast, when the 90°-phase-offset current component is determined, the switch switches at those points in time at which the oscillating voltage $V_a$ applied to the electrode 14 has a maximum or a minimum. The control circuit 30 is advantageously configured as represented in FIG. 8, comprising a phase shifter 32 and a comparator 34. The comparator 34 compares the output of phase shifter 32 with ground. If the output of the phase shifter 32 is at a potential higher than ground, the comparator outputs a "high" signal to switch 22. If the output of the phase shifter 32 is at a potential lower than ground, the comparator outputs a "low" signal to switch 22. If the in-phase component of the current is to be determined, the phase shifter forwards the oscillator signal substantially without an additional phase shift. As a result, the output of the comparator is "high" during the first time intervals $TI_1$ and "low" during the second time intervals $TI_2$ (see curve labeled $V_{comp1}$ in FIG. 6). If the 90°-phase-offset component of the current is to be determined, the phase shifter forwards the oscillator signal with an additional phase shift of substantially 90°. As a result, the output of the comparator is "high" during the third time intervals $TI_3$ and "low" during the fourth time intervals $TI_4$ (see curve labeled $V_{comp2}$ in FIG. 6). It should be noted that the "high" and "low" outputs of comparator 34 are not necessarily opposed to one another, as shown in FIG. 6. The "low" output could e.g. be situated at ground potential. The additional phase shift provided by the phase shifter 32 may be controlled by the microprocessor 50. The latter may, in particular, provide a clock signal to phase shifter 32, which determines the frequency of the alternance between determining the in-phase current component and determining the 90°-phase-offset current component.

In FIGS. 2-5, elements similar to elements of FIG. 1 have been attributed the same reference numeral as the corresponding element of FIG. 1, preceded by a prefix according to the number of the drawing.

Figure 2:
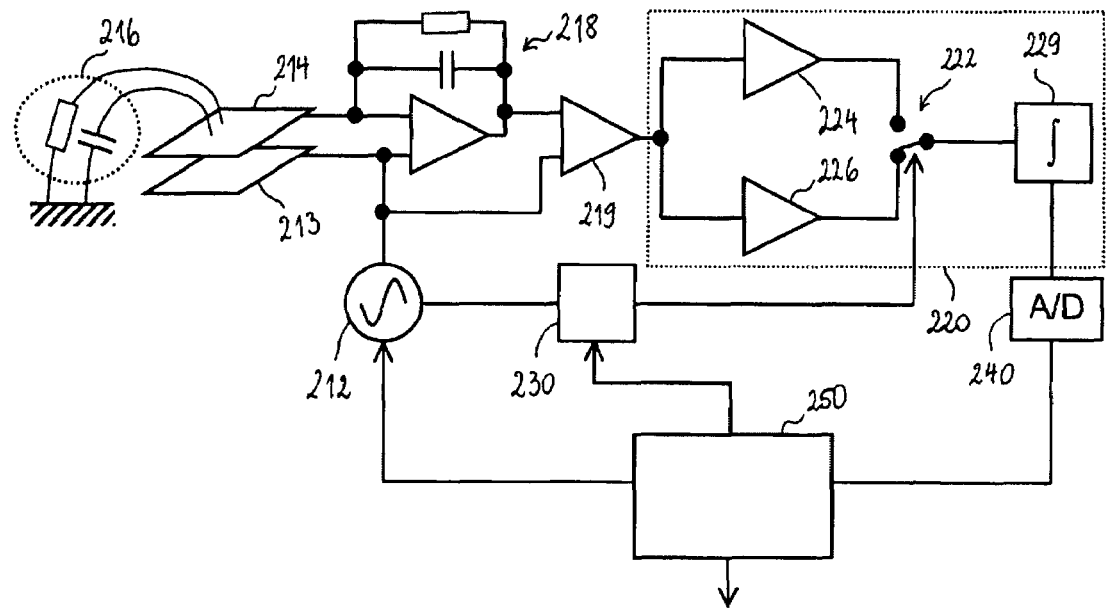
FIG. 2 is a simplified block diagram showing second embodiment of a loading-mode occupant detection system.

FIG. 2 schematically shows a loading-mode capacitive occupant detection system according to a further embodiment. Oscillator 212 applies an oscillating voltage signal $V_a$ of a chosen frequency to the shielding electrode 213 and to the transmitting and sensing electrode 214. Shielding electrode 213 is connected to the output of oscillator 212. Current-to-voltage converter 218 maintains the sensing electrode 214 at substantially the same electric potential as the shielding electrode. The characteristics of the current flowing in the sensing electrode depend on the impedance 216 between sensing electrode 214 and ground. The advantage of providing a shielding electrode 213 is that the sensitivity of the sensing electrode 214 can be directed into a specific direction, e.g. towards a region that an occupant normally occupies.

A difference amplifier 219 amplifies the potential difference between the output pin of signal current-to-voltage converter 218 and the output of oscillator 212, this potential difference being indicative of the current flowing in the sensing electrode. In this case, the signal output by the difference amplifier 219 is considered as the converter voltage signal $V_c$. The converter voltage signal $V_c$ is fed to a clocked rectifier 220 that includes a switch 222, an amplifier circuit (having a first branch with an inverting amplifier 224 and a second branch with a non-inverting amplifier 226) and an integrator 229. The converter voltage signal $V_c$ is supplied to the inverting amplifier 224 and the non-inverting amplifier 226. The gain of amplifier 224 is opposite to that of amplifier 226 (e.g. −1 and 1, respectively). The outputs of and of amplifiers 224 and 226 are combined in alternance and fed to integrator 229 by switch 222.

The switch 222 is controlled by a control circuit 230, which operates as the control circuit 30 described in detail with reference to FIG. 1. As will be appreciated, integrator 229 integrates the first and second intermediate voltage signals $V_{i1}$, $V_{i2}$ that intervene in clocked rectifier 220. Those skilled will note that integrating a signal for a given period of time enables one to determine the average of the signal during the given period. The integration time being known, signals output as time integrals are thus at least as meaningful as the corresponding time-averaged signals. Integrator 229 thus outputs signals indicative of the in-phase and 90°-phase-offset components as analog signals and feeds them to an analog-to-digital converter 240, which, in turn forwards them in digital form to microprocessor 250. Microprocessor 250 thereupon determines an occupancy state.

Figure 3:
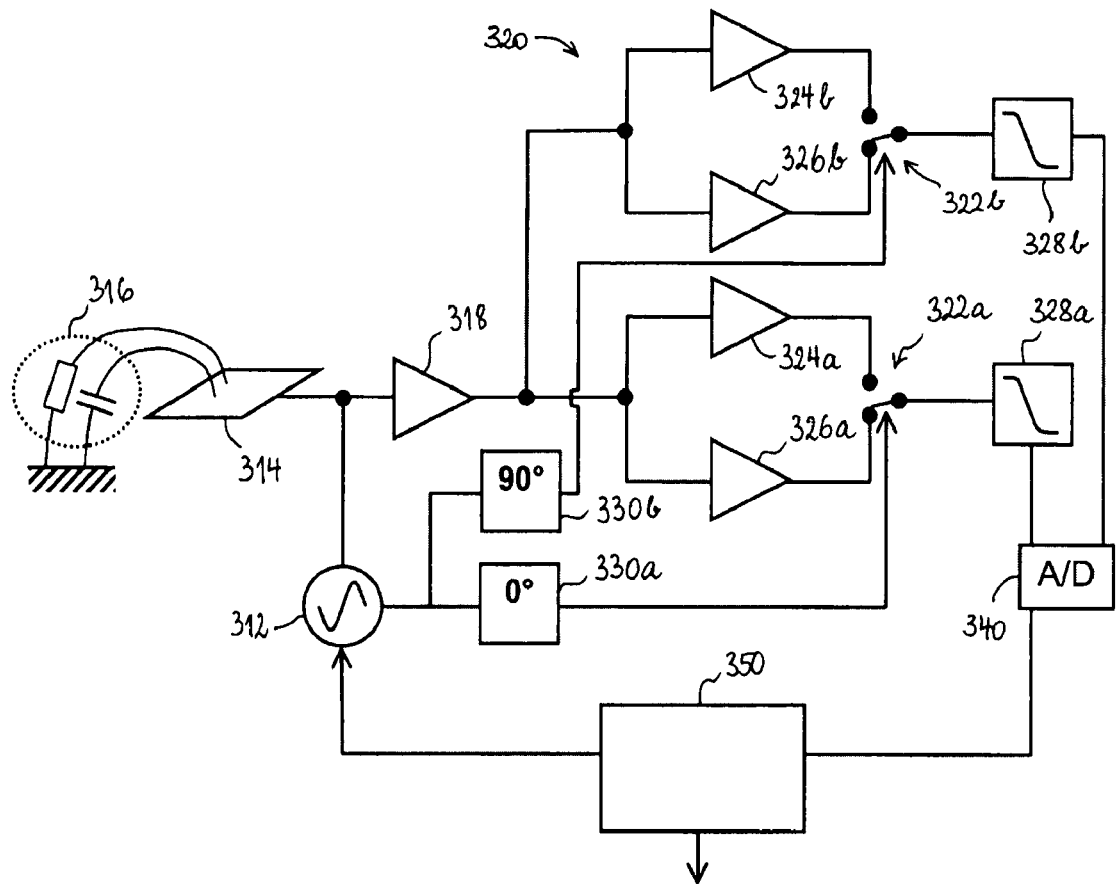
FIG. 3 is a simplified block diagram showing a third embodiment of a loading-mode occupant detection system.

FIG. 3 schematically shows a loading-mode capacitive occupant detection system according to yet a further embodiment. Oscillator 312 applies an oscillating voltage signal $V_a$ to the transmitting and sensing electrode 314. Current-tovoltage converter 318 outputs the converter voltage signal $V_c$ indicative of the current flowing in the sensing electrode 314 and thus of the impedance 316 between the sensing electrode 314 and ground. The main advantage of the embodiment of FIG. 3 with respect to the embodiments of FIGS. 1 and 2 is the fact that it comprises an "enhanced" clocked rectifier 320, which outputs the signals indicative, respectively, of the in-phase current component and the 90°-phase-offset current component substantially at the same time.

The converter voltage signal $V_c$ is fed to the enhanced clocked rectifier 320. The latter includes a first amplifier branch including an inverting amplifier 324a and a non-inverting amplifier 326a, of opposite gain factors, operatively connected to the current-to-voltage converter 318 and a first switch 322a. The converter voltage signal $V_c$ is applied to the inverting amplifier 324a and the non-inverting amplifier 326a. The first switch 322a alternately switches to the inverting amplifier 324a and the non-inverting amplifier 326a. The enhanced clocked rectifier 320 further includes a second amplifier branch including an inverting amplifier 324b and a non-inverting amplifier 326b, of opposite gain factors, operatively connected to the current-to-voltage converter 318 and a second switch 322b. The converter voltage signal is applied to the inverting amplifier 324b and the non-inverting amplifier 326b. The second switch 322b alternately switches to the inverting amplifier 324b and the non-inverting amplifier 326b.

The control circuit 330a makes the switch 322a switch to the non-inverting amplifier 326a every time the oscillating voltage $V_a$ applied to the electrode is positive, i.e. during the previously mentioned first time intervals $TI_1$. If the oscillating voltage $V_a$ applied to the electrode is negative, i.e. during the second time intervals $TI_2$, control circuit 330a makes the switch 322a switch to inverting amplifier 324a. The output signals of the amplifiers 324a and 326a are thus combined into an intermediate signal $V_{i1}$ (the "first" intermediate signal) and input to low-pass filter 328a, arranged downstream of switch 322a, with respect to the amplifiers 324a and 326a. Low-pass filter 328a thus outputs a signal $V_{o1}$ (the time-average of first intermediate signal $V_{i1}$) indicative of the in-phase current component as an analog signal and feeds it to analog-to-digital converter 340.

The other control circuit 330b makes the switch 322b switch to the non-inverting amplifier 326b every time the oscillating voltage $V_a$ applied to the electrode is on a positive slope, i.e. during the previously mentioned third time intervals $TI_3$. If the oscillating voltage $V_a$ applied to the electrode is on a negative slope, i.e. during the fourth time intervals $TI_4$, control circuit 330b makes the switch 322b switch to inverting amplifier 324b. The output signals of the amplifiers 324b and 326b are thus combined into an intermediate signal $V_{i2}$ (the "second" intermediate signal) and input to low-pass filter 328b, arranged downstream of switch 322b, with respect to the amplifiers 324b and 326b. The voltage signal $V_{o2}$ output in consequence by low-pass-filter 328b corresponds to a time-average of the second intermediate signal $V_{i2}$ and indicates the 90°-phase-offset component of the current. This analog signal indicative of the 90°-phase-offset component of the current is also fed to analog-to-digital converter 340.

Analog-to-digital converter 340 combines the signal indicative of the in-phase current component and the signal indicative of the 90°-phase-offset current component into a multiplexed digital signal including the information on both current components. Microprocessor 350 receives the multiplexed signal, extracts the relevant information and computes a decision as to which occupancy state it provides as output.

With respect to the control circuits 330a and 330b, it may be worthwhile noting that they may be implemented as shown in FIG. 8. In this case, the phase shifter associated with control circuit 330b provides a fixed 90° phase shift. The phase shifter associated with control circuit 330a provides a fixed zero phase shift, i.e. this phase shifter might be omitted.

Coupling-mode capacitive occupant detection systems are now discussed with reference to FIGS. 4 and 5. It will become apparent that operation of the coupling-mode systems is similar in most points to operation of the loading-mode systems discussed hereinbefore. The most important difference between a pure coupling mode system and a pure loading-mode system is that in the former the oscillating voltage signal $V_a$ is applied to a transmitting electrode, whereas a current is measured on a sensing electrode different from the transmitting electrode.

Figure 4:
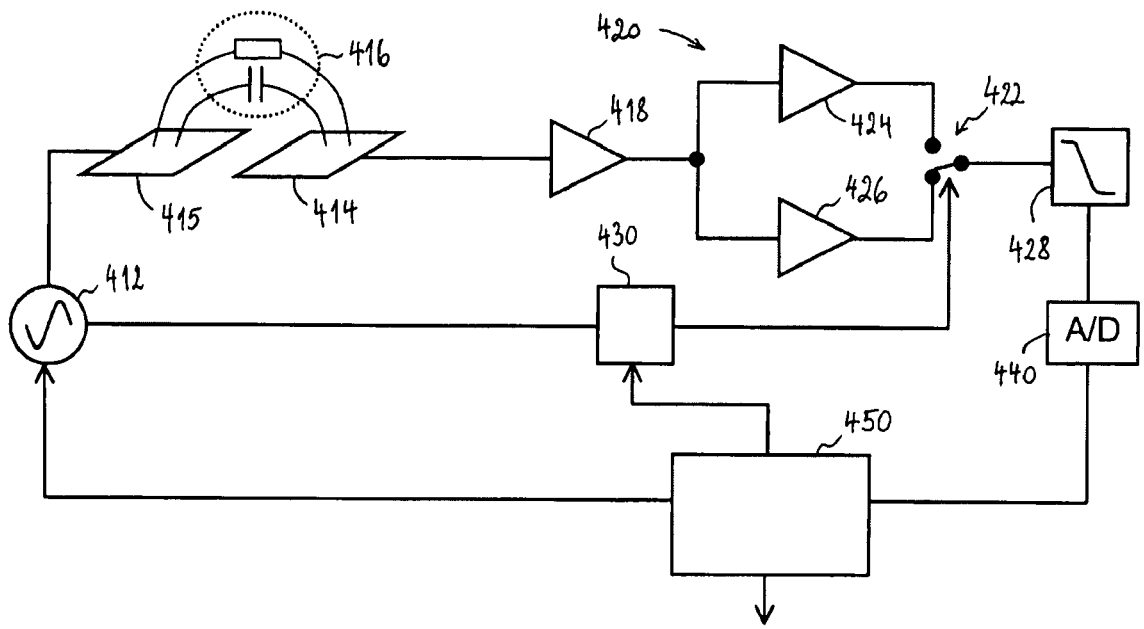
FIG. 4 is a simplified block diagram showing a first embodiment of a coupling-mode occupant detection system.

Turning now to FIG. 4, it is shown a coupling-mode capacitive occupant detection system 410. An oscillator 412 applies an oscillating voltage signal $V_a$ to the transmitting electrode 415. In response to the oscillating voltage signal $V_a$ being applied to electrode 415, a current is caused to flow in sensing electrode 414, disposed in vicinity of the transmitting electrode 415. The characteristics of this current depend on the impedance 416 between the electrodes 415 and 414. The impedance and the current allow drawing conclusions with respect to the presence or absence of objects or occupants in the region located between the electrodes 414 and 415. As in the loading-mode embodiments, the current flowing in the electrode 414 can be expressed as a sum of a first current component which is in phase with the oscillating voltage signal $V_a$ applied to the transmitting electrode 415 and a second current component which is 90°-phase-offset with respect to the oscillating voltage signal $V_a$ applied to the transmitting electrode 415.

Current-to-voltage converter 418, operatively connected to the sensing electrode 414 converts the current flowing therein into a converter voltage signal $V_c$. The converter voltage signal $V_c$ is fed to a clocked rectifier 420 that includes a switch 422, a first branch with an inverting amplifier 424, a second branch with a non-inverting amplifier 426 and a low-pass filter 428. The converter voltage signal $V_c$ is supplied to the inverting amplifier 424 and the non-inverting amplifier 426, in accordance with the binary signal provided by the control circuit 430. The gain of amplifier 424 is opposite to that of amplifier 426 (e.g. −1 and 1, respectively). Switch 422 combines the outputs of amplifiers 424 and 426 in alternance and feeds the combined signal (first or second intermediate voltage signal) to the low-pass filter 428. The latter is connected to analog-to digital converter 440, to which the low-passed signals are supplied. Analog-to-digital converter converts the low-passed signals into digital signals, which are sent to microprocessor 450. Since the system 410 operates essentially as the system of FIG. 1, the different acts performed by the various elements of the circuit are not repeated here and the reader is referred to the description of the embodiment of FIG. 1 for the details.

Figure 5:
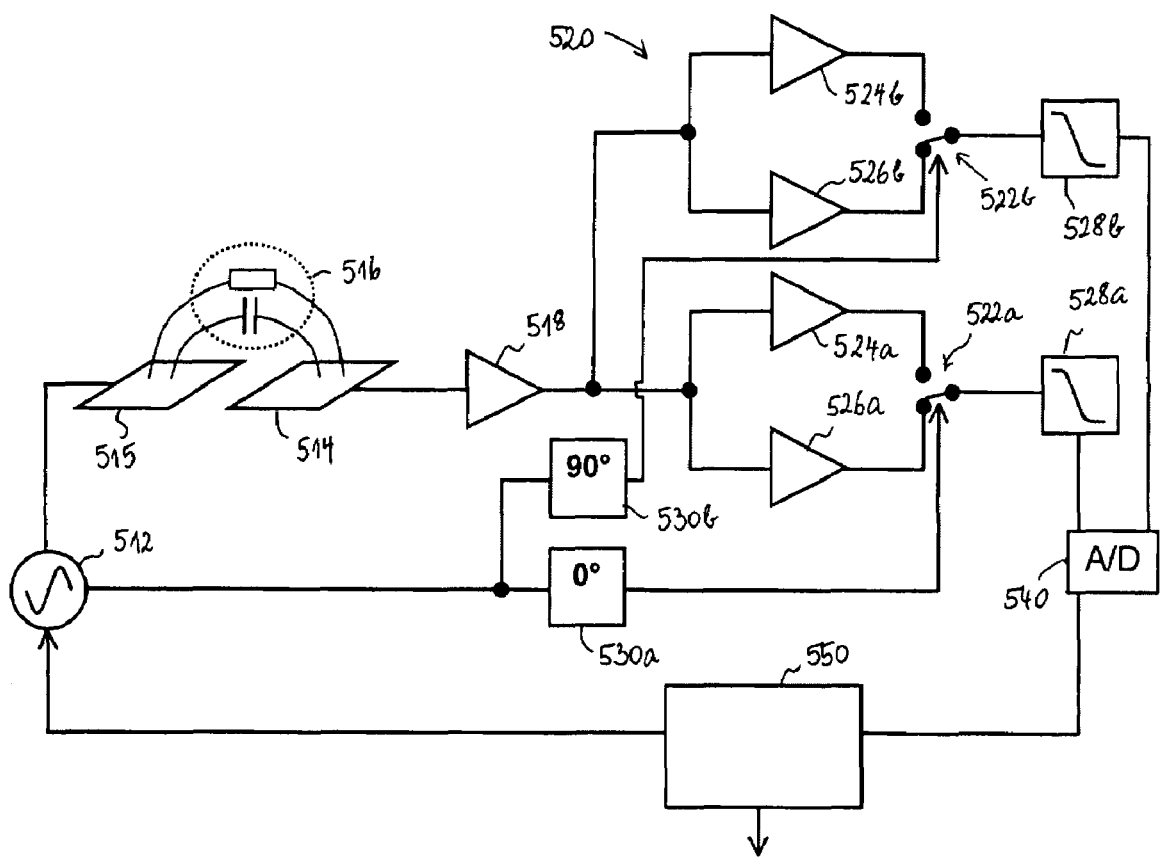
FIG. 5 is a simplified block diagram showing a second embodiment of a coupling-mode occupant detection system.

FIG. 5 shows a coupling mode capacitive occupant detection system 510 with an enhanced clocked rectifier 520. Oscillator 512 applies an oscillating voltage signal $V_a$ to the transmitting electrode 515. In response to the oscillating voltage signal $V_a$ being applied to electrode 515, a current is caused to flow in sensing electrode 514, disposed in vicinity of the transmitting electrode 415. The characteristics of this current depend on the impedance 516 between the electrodes 515 and 514. Current-to-voltage converter 518 converts the current flowing in the sensing electrode 514 into a converter voltage signal $V_c$ indicative of this current and thus of the impedance.

The converter voltage signal $V_c$ is fed to the enhanced clocked rectifier 520, which is analogous to the enhanced clocked rectifier 320. The clocked rectifier 520 includes a first amplifier branch including an inverting amplifier 524a and a non-inverting amplifier 526a, of opposite gain factors, operatively connected to the current-to-voltage converter 518 and a first switch 522a alternately switching the inverting amplifier 524a and the non-inverting amplifier 526a to a first low-pass filter 528a. The enhanced clocked rectifier 520 further includes a second first amplifier branch including an inverting amplifier 524b and a non-inverting amplifier 526b, of opposite gain factors, operatively connected to the current-to-voltage converter 518 and a first switch 522b alternately switching the inverting amplifier 524b and the non-inverting amplifier 526b to a second low-pass filter 528a.

The control circuit 530a makes the switch 522a switch to the non-inverting amplifier 526a every time the oscillating voltage signal $V_a$ applied to the electrode is positive, i.e. first time intervals. $TI_1$ If the oscillating voltage $V_a$ applied to the electrode is negative, i.e. during the second time intervals $TI_2$, control circuit 530a makes the switch 522a switch to inverting amplifier 524a. The output signals of the amplifiers 524a and 526a are thus combined into an intermediate signal $V_{i1}$ (the "first" intermediate signal) and input to low-pass filter 528a. Low-pass filter 528a thus outputs a signal $V_{o1}$ indicative of the in-phase current component as an analog signal and feeds it to analog-to-digital converter 540.

The other control circuit 530b makes the switch 522b switch to the non-inverting amplifier 526b every time the oscillating voltage signal $V_a$ applied to the electrode is on a positive slope, i.e. during the third time intervals $TI_3$. If the oscillating voltage $V_a$ applied to the electrode is on a negative slope, i.e. during the fourth time intervals $TI_4$, control circuit 530b makes the switch 522b switch to inverting amplifier 524b. The output signals of the amplifiers 524b and 526b are thus combined into an intermediate signal $V_{i2}$ (the "second" intermediate signal) and input to low-pass filter 528b. The voltage signal $V_{o2}$ output in consequence by low-pass-filter 528b corresponds to a time-average of the second intermediate signal $V_{i2}$ and indicates the 90°-phase-offset component of the current. This analog signal indicative of the 90°-phase-offset component of the current is also fed to analog-to-digital converter 540.

Analog-to-digital converter 540 combines the signal $V_{o1}$ indicative of the in-phase current component and the signal $V_{o2}$ indicative of the 90°-phase-offset current component into a multiplexed digital signal including the information on both current components. Microprocessor 550 receives the multiplexed signal, extracts the relevant information and computes a decision as to which occupancy state it provides as output.

With respect to the control circuits 530a and 530b, it may be worthwhile noting that they may be implemented as shown in FIG. 8. In this case, the phase shifter associated with control circuit 530b provides a fixed 90° phase shift. The phase shifter associated with control circuit 530a provides a fixed zero phase shift, i.e. this phase shifter might be omitted.

It should be noted that the use of a shielding electrode or electrodes is not excluded and is even considered advantageous in the embodiments that have not been specifically described having this feature.

In case the electrodes mentioned herein are to be integrated into a seat, they are preferably constructed from or incorporated into flexible material to provide seating comfort for the occupant. By way of example, the electrode could be composed of metal fibers sewn into a textile material (e.g. a textile layer of the seat) or conductive ink disposed on the surface of some substrate material, such as e.g. a dielectric film. Alternatively, the electrodes could be formed from a metal plate or foil.

It should be noted that in each one of the embodiments disclosed herein, the oscillator, the sensing circuit and the processor could be implemented as an application-specific integrated circuit (ASIC). In such an ASIC, elements individually described herein could be integrated into combined elements.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. A capacitive occupant detection system, comprising:
an oscillator;
an electrode operatively coupled to said oscillator, wherein said oscillator applies an oscillating voltage signal to said electrode, wherein a current is caused to flow in said electrode, said current being responsive to an electric-field-influencing property of an object or occupant proximate to said electrode, said current having a first current component in phase with said oscillating voltage signal and a second current component 90-degrees-phase-offset with respect to said oscillating voltage signal;
a sensing circuit, operatively coupled to said electrode and to said oscillator, said sensing circuit generating a first signal indicative of said first current component and a second signal indicative of said second current component; and
a processor, operatively coupled to said sensing circuit, determining an occupancy state based upon said first and second signals indicative of said first and second current components, respectively, and outputting an output signal indicative of said occupancy state,
wherein said applied oscillating voltage signal is a sinusoidal voltage signal having a number of oscillation periods, said oscillating voltage signal being positive during first time intervals, negative during second time intervals, of positive slope during third time intervals and of negative slope during fourth time intervals, each one of said first, second, third and fourth time intervals having a duration of half said oscillation period, said first time intervals being in alternate succession with said second time intervals, said third time intervals being in alternate succession with said fourth time intervals, each of said first intervals overlapping with one of said third intervals and one of said fourth intervals, and each of said second intervals overlapping with one of said third intervals and one of said fourth intervals, wherein said sensing circuit comprises
a current-to-voltage converter operatively coupled to said electrode so as to output a converter voltage signal proportional to the current flowing in said electrode,
a clocked rectifier, said clocked rectifier being operatively coupled to said oscillator and to said current-to-voltage converter, wherein said clocked rectifier provides
a first intermediate voltage signal comprising, during said first time intervals, one of a non-inverse copy and an inverse copy of said converter voltage signal and, during said second time intervals, the other of said non-inverse copy and said inverse copy, and a second intermediate voltage signal comprising, during said third time intervals, one of a non-inverse copy and an inverse copy of said converter voltage signal and during said fourth time intervals the other of said non-inverse copy and said inverse copy, and wherein said clocked rectifier generates said first signal indicative of said first current component as a time average or time integral of said first intermediate voltage signal and said second signal indicative of said second current component as a time average or time integral of said second intermediate voltage signal.

2. The capacitive occupant detection system as claimed in claim 1, wherein said clocked rectifier provides said first intermediate voltage signal and said first signal indicative of said first current component in alternation with said second intermediate voltage signal and said second signal indicative of said second current component.

3. The capacitive occupant detection system as claimed in claim 1, wherein said clocked rectifier provides said first intermediate voltage signal and said first signal indicative of said first current component in parallel with said second intermediate voltage signal and said second signal indicative of said second current component.

4. The capacitive occupant detection system as claimed in claim 1, wherein said clocked rectifier comprises at least one amplifier circuit operatively connected to said current-to-voltage converter, said at least one amplifier circuit being capable of alternately inverting and non-inverting said converter voltage signal so as to provide the inverted and non-inverted copies of said first and/or second intermediate voltage signals, and a switch operatively connected to said at least one amplifier circuit for switching said at least one amplifier circuit between inverting and non-inverting said converter voltage signal.

5. The capacitive occupant detection system as claimed in claim 4, wherein said clocked rectifier comprises a low-pass filter or integrator, wherein said at least one amplifier circuit includes an inverting amplifier and a non-inverting amplifier arranged in parallel, and wherein said switch alternately switches said inverting amplifier and said non-inverting amplifier to said low-pass filter or integrator.

6. The capacitive occupant detection system as claimed in claim 1, wherein said clocked rectifier comprises at least one first amplifier circuit operatively connected to said current-to-voltage converter and a first switch switching said at least one first amplifier circuit between inverting and non-inverting said converter voltage signal so as to provide the inverted and non-inverted copies of said first intermediate voltage signal, and at least one second amplifier circuit operatively connected to said current-to-voltage converter and a second switch switching said at least one second amplifier circuit between inverting and non-inverting said converter voltage signal so as to provide the inverted and non-inverted copies of said second intermediate voltage signal.

7. The capacitive occupant detection system as claimed in claim 6, wherein said clocked rectifier comprises a first low-pass filter or integrator and a second low-pass filter or integrator, wherein said at least one first amplifier circuit includes an inverting first amplifier and a non-inverting first amplifier arranged in parallel, said first switch alternately switching said inverting first amplifier and said non-inverting first amplifier to said first low-pass filter or integrator, and wherein said at least one second amplifier circuit includes an inverting second amplifier and a non-inverting second amplifier, said second switch alternately switching said inverting second amplifier and said non-inverting second amplifier to said second low-pass filter or integrator.

8. The capacitive occupant detection system as claimed in claim 1, wherein said clocked rectifier comprises at least one low-pass filter providing said first signal indicative of said first current component as a time average of said first intermediate voltage signal and/or said second signal indicative of said second current component as a time average of said second intermediate voltage signal.

9. The capacitive occupant detection system as claimed in claim 1, wherein said clocked rectifier comprises at least one integrator providing said first signal indicative of said first current component as a time integral of said first intermediate voltage signal and/or said second signal indicative of said second current component as a time integral of said second intermediate voltage signal.

10. A capacitive occupant detection system, comprising:

an oscillator;

an electrode operatively coupled to said oscillator, wherein said oscillator applies an oscillating voltage signal to said electrode, wherein a current is caused to flow in said electrode, said current being responsive to an electric-field-influencing property of an object or occupant proximate to said electrode, said current having a first current component in phase with said oscillating voltage signal and a second current component 90-degrees-phase-offset with respect to said oscillating voltage signal;

a sensing circuit, operatively coupled to said electrode and to said oscillator, said sensing circuit generating a first signal indicative of said first current component and a second signal indicative of said second current component; and a processor, operatively coupled to said sensing circuit, determining an occupancy state based upon said first and second signals indicative of said first and second current components, respectively, and outputting an output signal indicative of said occupancy state, wherein said processor determines said occupancy state based upon a comparison of said second signal indicative of said second current component with a threshold, said threshold being dependent upon said first signal indicative of said first current component.

11. The capacitive occupant detection system as claimed in claim 10, wherein said threshold is a growing function of said first signal indicative of said first current component.

12. A capacitive occupant detection system, comprising:

an oscillator;

an electrode operatively coupled to said oscillator, wherein said oscillator applies an oscillating voltage signal to said electrode, wherein a current is caused to flow in said electrode, said current being responsive to an electric-field-influencing property of an object or occupant proximate to said electrode, said current having a first current component in phase with said oscillating voltage signal and a second current component 90-degrees-phase-offset with respect to said oscillating voltage signal;

a sensing circuit, operatively coupled to said electrode and to said oscillator, said sensing circuit generating a first signal indicative of said first current component and a second signal indicative of said second current component; and a processor, operatively coupled to said sensing circuit, determining an occupancy state based upon said first and second signals indicative of said first and second current components, respectively, and outputting an output signal indicative of said occupancy state, wherein said processor modifies said second signal indicative of said second current component based upon said first signal indicative of said first current component and determines said occupancy state based upon a comparison of said modified second signal with a threshold.

13. A capacitive occupant detection system for a vehicle seat, comprising:

an oscillator;

a sensing electrode for being arranged underneath a surface of said vehicle seat, a shielding electrode, for being placed adjacent said sensing electrode so that said sensing electrode is situated between said surface and said shielding electrode, wherein said sensing and shielding electrodes are operatively coupled to said oscillator, wherein said oscillator is configured for driving said sensing and shielding electrodes with an oscillating voltage signal, said oscillating voltage signal being substantially the same in amplitude and phase for said sensing and shielding electrodes, a current being caused to flow in said sensing electrode in response to said oscillator driving said sensing and shielding electrodes, said current being responsive to an electric-field-influencing property of an object or occupant proximate to said electrode, said current occurring with a first current component in phase with said oscillating voltage signal and a second current component 90-degrees-phase-offset with respect to said oscillating voltage signal;

a sensing circuit, operatively coupled to said sensing electrode and to said oscillator and configured for generating a first signal indicative of said first current component and a second signal indicative of said second current component; and a processor, operatively coupled to said sensing circuit, configured for determining an occupancy state based upon said first and second signals indicative of said first and second current components, respectively, and for outputting an output signal indicative of said occupancy state wherein said applied oscillating voltage signal is a sinusoidal voltage signal having a number of oscillation periods, said oscillating voltage signal being positive during first time intervals, negative during second time intervals, of positive slope during third time intervals and of negative slope during fourth time intervals, each one of said first, second, third and fourth time intervals having a duration of half said oscillation period, said first time intervals being in alternate succession with said second time intervals, said third time intervals being in alternate succession with said fourth time intervals, each of said first intervals overlapping with one of said third intervals and one of said fourth intervals, and each of said second intervals overlapping with one of said third intervals and one of said fourth intervals, wherein said sensing circuit comprises a current-to-voltage converter operatively coupled to said sensing electrode and configured for outputting a converter voltage signal proportional to the current flowing in said sensing electrode, a clocked rectifier, said clocked rectifier being operatively coupled to said oscillator and to said current-to-voltage converter, wherein said clocked rectifier is configured for providing a first intermediate voltage signal comprising, during said first time intervals, one of a non-inverse copy and an inverse copy of said converter voltage signal and, during said second time intervals, the other of said non-inverse copy and said inverse copy, and a second intermediate voltage signal comprising, during said third time intervals, one of a non-inverse copy and an inverse copy of said converter voltage signal and during said fourth time intervals the other of said non-inverse copy and said inverse copy, and wherein said clocked rectifier generates said first signal indicative of said first current component as a time average or time integral of said first intermediate voltage signal and said second signal indicative of said second current component as a time average or time integral of said second intermediate voltage signal.

14. The capacitive occupant detection system as claimed in claim 13, wherein said clocked rectifier comprises at least one amplifier circuit operatively connected to said current-to-voltage converter, said at least one amplifier circuit being configured for alternately inverting and non-inverting said converter voltage signal so as to provide the inverted and non-inverted copies of said first and/or second intermediate voltage signals, and a switch operatively connected to said at least one amplifier circuit for switching said at least one amplifier circuit between inverting and non-inverting said converter voltage signal.

15. The capacitive occupant detection system as claimed in claim 13, wherein said clocked rectifier comprises at least one low-pass filter for providing said first signal indicative of said first current component as a time average of said first intermediate voltage signal and/or said second signal indicative of said second current component as a time average of said second intermediate voltage signal.

16. The capacitive occupant detection system as claimed in claim 13, wherein said clocked rectifier comprises at least one integrator for providing said first signal indicative of said first current component as a time integral of said first intermediate voltage signal and/or said second signal indicative of said second current component as a time integral of said second intermediate voltage signal.

17. A capacitive occupant detection system for a vehicle seat, comprising:

an oscillator;

a sensing electrode for being arranged underneath a surface of said vehicle seat, a shielding electrode, for being placed adjacent said sensing electrode so that said sensing electrode is situated between said surface and said shielding electrode, wherein said sensing and shielding electrodes are operatively coupled to said oscillator, wherein said oscillator is configured for driving said sensing and shielding electrodes with an oscillating voltage signal, said oscillating voltage signal being substantially the same in amplitude and phase for said sensing and shielding electrodes, a current being caused to flow in said sensing electrode in response to said oscillator driving said sensing and shielding electrodes, said current being responsive to an electric-field-influencing property of an object or occupant proximate to said electrode, said current occurring with a first current component in phase with said oscillating voltage signal and a second current component 90-degrees-phase-offset with respect to said oscillating voltage signal;

a sensing circuit, operatively coupled to said sensing electrode and to said oscillator and configured for generating a first signal indicative of said first current component and a second signal indicative of said second current component; and a processor, operatively coupled to said sensing circuit, configured for determining an occupancy state based upon said first and second signals indicative of said first and second current components, respectively, and for outputting an output signal indicative of said occupancy state, wherein said processor determining said occupancy state based upon a comparison of said second signal indicative of said second current component with a threshold, said threshold being dependent upon said first signal indicative of said first current component.

18. The capacitive occupant detection system as claimed in claim 17, wherein said threshold is a growing function of said first signal indicative of said first current component.

19. A capacitive occupant detection system for a vehicle seat, comprising:

an oscillator;

a sensing electrode for being arranged underneath a surface of said vehicle seat, a shielding electrode, for being placed adjacent said sensing electrode so that said sensing electrode is situated between said surface and said shielding electrode, wherein said sensing and shielding electrodes are operatively coupled to said oscillator, wherein said oscillator is configured for driving said sensing and shielding electrodes with an oscillating voltage signal, said oscillating voltage signal being substantially the same in amplitude and phase for said sensing and shielding electrodes, a current being caused to flow in said sensing electrode in response to said oscillator driving said sensing and shielding electrodes, said current being responsive to an electric-field-influencing property of an object or occupant proximate to said electrode, said current occurring with a first current component in phase with said oscillating voltage signal and a second current component 90-degrees-phase-offset with respect to said oscillating voltage signal;

a sensing circuit, operatively coupled to said sensing electrode and to said oscillator and configured for generating a first signal indicative of said first current component and a second signal indicative of said second current component; and a processor, operatively coupled to said sensing circuit, configured for determining an occupancy state based upon said first and second signals indicative of said first and second current components, respectively, and for outputting an output signal indicative of said occupancy state, wherein said processor modifying said second signal indicative of said second current component based upon said first signal indicative of said first current component and for determining said occupancy state based upon a comparison of said modified second signal with a threshold.

20. A capacitive occupant detection system, comprising:

an oscillator;

a transmitting electrode, operatively coupled to said oscillator, said oscillator being configured for applying an oscillating voltage signal to said transmitting electrode, a sensing electrode for being arranged in proximity of said transmitting electrode in such a way that a current may be caused to flow in said sensing electrode by capacitive coupling between said transmitting electrode and said sensing electrode, said current being responsive to an electric-field-influencing property of an object or occupant in a region between said transmitting and sensing electrodes, said current occurring with a first current component in phase with said applied oscillating voltage signal and a second current component 90-degrees-phase-offset with respect to said oscillating voltage signal;

a sensing circuit, operatively coupled to said sensing electrode and to said oscillator and configured for generating a first signal indicative of said first current component and a second signal indicative of said second current component; and a processor, operatively coupled to said sensing circuit, configured for determining an occupancy state based upon said first and second signals indicative of said first and second current components, respectively, and for outputting an output signal indicative of said occupancy state, wherein said applied oscillating voltage signal is a sinusoidal voltage signal having a number of oscillation periods, said oscillating voltage signal being positive during first time intervals, negative during second time intervals, of positive slope during third time intervals and of negative slope during fourth time intervals, each one of said first, second, third and fourth time intervals having a duration of half said oscillation period, said first time intervals being in alternate succession with said second time intervals, said third time intervals being in alternate succession with said fourth time intervals, each of said first intervals overlapping with one of said third intervals and one of said fourth intervals, and each of said second intervals overlapping with one of said third intervals and one of said fourth intervals, wherein said sensing circuit comprises a current-to-voltage converter operatively coupled to said sensing electrode and configured for outputting a converter voltage signal proportional to the current flowing in said sensing electrode, a clocked rectifier, said clocked rectifier being operatively coupled to said oscillator and to said current-to-voltage converter, wherein said clocked rectifier is configured for providing a first intermediate voltage signal comprising, during said first time intervals, one of a non-inverse copy and an inverse copy of said converter voltage signal and, during said second time intervals, the other of said non-inverse copy and said inverse copy, and a second intermediate voltage signal comprising, during said third time intervals, one of a non-inverse copy and an inverse copy of said converter voltage signal and during said fourth time intervals the other of said non-inverse copy and said inverse copy, and wherein said clocked rectifier generates said first signal indicative of said first current component as a time average or time integral of said first intermediate voltage signal and said second signal indicative of said second current component as a time average or time integral of said second intermediate voltage signal.

21. The capacitive occupant detection system as claimed in claim 20, wherein said clocked rectifier comprises at least one amplifier circuit operatively connected to said current-to-voltage converter, said at least one amplifier circuit being configured for alternately inverting and non-inverting said converter voltage signal so as to provide the inverted and non-inverted copies of said first and/or second intermediate voltage signals, and a switch operatively connected to said at least one amplifier circuit for switching said at least one amplifier circuit between inverting and non-inverting said converter voltage signal.

22. The capacitive occupant detection system as claimed in claim 20, wherein said clocked rectifier comprises at least one low-pass filter providing said first signal indicative of said first current component as a time average of said first intermediate voltage signal and/or said second signal indicative of said second current component as a time average of said second intermediate voltage signal.

23. The capacitive occupant detection system as claimed in claim 20, wherein said clocked rectifier comprises at least one integrator providing said first signal indicative of said first current component as a time integral of said first intermediate voltage signal and/or said second signal indicative of said second current component as a time integral of said second intermediate voltage signal.

24. A capacitive occupant detection system, comprising:
an oscillator;
a transmitting electrode, operatively coupled to said oscillator, said oscillator being configured for applying an oscillating voltage signal to said transmitting electrode,
a sensing electrode for being arranged in proximity of said transmitting electrode in such a way that a current may be caused to flow in said sensing electrode by capacitive coupling between said transmitting electrode and said sensing electrode, said current being responsive to an electric-field-influencing property of an object or occupant in a region between said transmitting and sensing electrodes, said current occurring with a first current component in phase with said applied oscillating voltage signal and a second current component 90-degrees-phase-offset with respect to said oscillating voltage signal;
a sensing circuit, operatively coupled to said sensing electrode and to said oscillator and configured for generating a first signal indicative of said first current component and a second signal indicative of said second current component; and
a processor, operatively coupled to said sensing circuit, configured for determining an occupancy state based upon said first and second signals indicative of said first and second current components, respectively, and for outputting an output signal indicative of said occupancy state, wherein said processor determining said occupancy state based upon a comparison of said second signal indicative of said second current component with a threshold, said threshold being dependent upon said first signal indicative of said first current component.

25. The capacitive occupant detection system as claimed in claim 24, wherein said threshold is a growing function of said first signal indicative of said first current component.

26. A capacitive occupant detection system, comprising:
an oscillator;
a transmitting electrode, operatively coupled to said oscillator, said oscillator being configured for applying an oscillating voltage signal to said transmitting electrode,
a sensing electrode for being arranged in proximity of said transmitting electrode in such a way that a current may be caused to flow in said sensing electrode by capacitive coupling between said transmitting electrode and said sensing electrode, said current being responsive to an electric-field-influencing property of an object or occupant in a region between said transmitting and sensing electrodes, said current occurring with a first current component in phase with said applied oscillating voltage signal and a second current component 90-degrees-phase-offset with respect to said oscillating voltage signal;
a sensing circuit, operatively coupled to said sensing electrode and to said oscillator and configured for generating a first signal indicative of said first current component and a second signal indicative of said second current component; and
a processor, operatively coupled to said sensing circuit, configured for determining an occupancy state based upon said first and second signals indicative of said first and second current components, respectively, and for outputting an output signal indicative of said occupancy state, wherein said processor modifying said second signal indicative of said second current component based upon said first signal indicative of said first current component and for determining said occupancy state based upon a comparison of said modified second signal with a threshold.

* * * * *